Patented Jan. 26, 1954

2,667,145

UNITED STATES PATENT OFFICE 2,667,145

NONFLUTTERING VALVE FOR POWER TRANSMISSION APPARATUS

Howard Frederick Hobbs and Joseph Arthur Thompson, Leamington Spa, England, assignors to Hobbs Transmission Limited, Leamington Spa, England, a British company Application September 22, 1949, Serial No. 117,162

2 Claims. (Cl. 121—38)

This invention relates to a valve for hydraulically actuated friction clutches of the kind provided with a movable clutch engaging ring carried by a rotary part and a space to receive liquid under pressure for actuating said ring, and inlet and exhaust ports associated with said space and controlled by valve means; and also to power transmission apparatus having at least two clutches of this kind whereby change of torque/speed ratio may be effected by variation of the engagement of the clutches. In apparatus of this kind we provide a valve located near the outer diameter of the liquid pressure space so as to open the liquid inlet when required to engage the clutch, and the exhaust port when it is required to disengage the clutch. If not located in this place, it would be impossible to exhaust the space. The valve may comprise a piston operating in a radial bore, and pressed radially outwards by a spring. The inlet and exhaust port, or ports, will lead from the space to the radial bore and will be opened or closed according to the position of the piston in the bore. The piston and spring will be of such mass that the centrifugal force extending to move the piston outwards will be equal to the centrifugal head on the liquid which will be led to the outer end of the piston. If the pressure supplied by the pump is caused to act on the outer end of the piston, it will move inwards thereby opening the inlet port. If the pressure delivered by the pump is removed from the outer end of the piston, the force on the spring will cause the piston to move outwards thereby uncovering the exhaust.

The liquid to engage the clutch must be led from the position near the axis of the housing through a radial duct, and the liquid pressure at the outer end of the duct will be much greater than that of the inner end of the duct due to centrifugal force. The inlet opening to the space must therefore be of substantially smaller cross sectional area than that of the inner end of the duct owing to the difference in pressure, otherwise a greater quantity of liquid will pass through the inlet in a given time than will enter the duct, and cavitation will result. This in turn will result in a reduced pressure at the outer end of the piston, which will allow it to move to the exhaust position, in which position the pressure would again build up, causing it to move inwards and "flutter" would occur, causing the inlet and exhaust ports to be rapidly opened and closed, with the result that liquid would enter and be exhausted from the space. In such circumstances, engagement of the clutch will be very delayed, if it becomes engaged at all. To overcome this defect, the cross sectional area of the entry port is suitably reduced in relation to the difference in pressures, and to the cross sectional area of the inner end of the duct, and the delivery from the pump. The piston is also made of suitable length in relation to the position of the inlet and exhaust openings so that slight movement of the valve will not cause the one to close and the other to open. If movement of the piston is substantial, the actual displacement of liquid will be such as to refill the duct if slight cavitation takes place, and thus restore the pressure before exhaust can take place.

An object of this invention is to provide a nonfluttering valve for a hydraulically actuated clutch construction.

Another object of this invention is to provide a valve in hydraulically actuated clutch construction whereby undue delay in engagement of the clutch is avoided.

In order that the invention may be readily carried into effect a constructional form thereof will now be described with reference to the accompanying drawing wherein.

Figure 1:
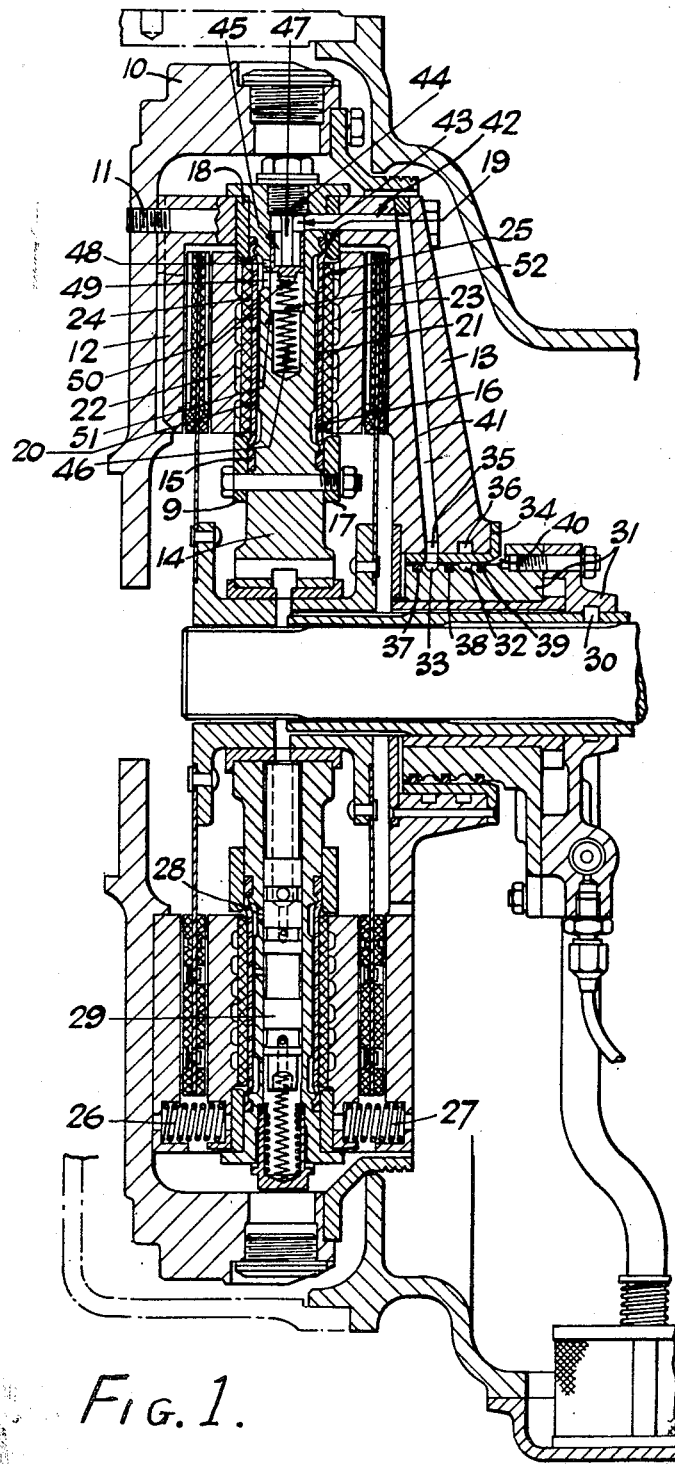
Figure 1 is a sectional view of a twin clutch assembly made in accordance with the present invention.
Figure 2:
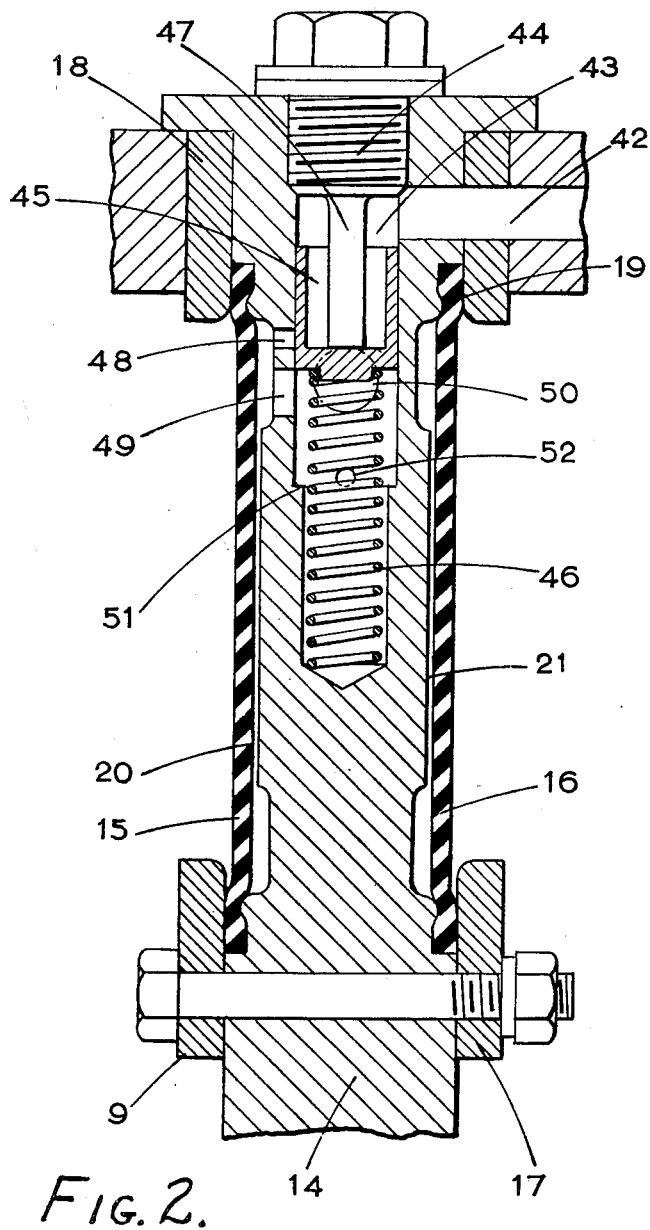
Figure 2 is an enlarged sectional view illustrating the valve.

The clutch unit is bolted to the engine flywheel 10 by means of bolts 11. The clutch unit comprises a front plate 12, a rear plate 13 and a valve body 14. The valve body carries the flexible diaphragms 15, 16, clamped at their inner diameters by clamping rings 9, 17, and at the outer diameters by clamping rings 18, 19, forming the spaces 20, 21 which receive fluid under pressure for actuating the engaging rings 22, 23, through the insulator plates 24, 25. Push-off springs 26, 27 act in the direction to disengage the engaging rings. Each space has an exhaust 28 which is controlled by a centrifugally actuated valve 29 which serves to automatically engage and disengage the clutch at some predetermined low R. P. M.

A pump 30, driven from the back plate 13, provides the fluid under pressure for actuating the rings and the pump body 31 carries a valve, not shown, which can either close the pressure or open it to either of the grooves 32, 33. Grooves 32, 33 are formed in a cylindrical part of the pump body which serves as a feed journal. The sleeve 34 has a number of holes which connect grooves 32, 33 with grooves 35, 36. Split rings 37, 38, 39 prevent excessive leakage of fluid. The chamfer 40 serves to close the rings for assembly. Each of the grooves 35, 36 is connected by a radial duct 41 to the cross drilling 42 which leads to the radial bore 43 closed by a plug 44. The valve piston 45 operates in the radial bore and the spring 46 serves to urge it outwards against the stop 47. The space is provided with entry port 48 and the exhaust port 49. The port 48 is circular and of much smaller diameter than the ducts 41, 42. The duct 42 or some part could alternatively or additionally be made smaller than the duct 41, and likewise the upper end of the duct 41 could be of reduced diameter. An exhaust drilling 50 enables the fluid to escape into the fixed housing enclosing the apparatus. A further drilling 52 is provided to prevent fluid being trapped beneath the valve 45.

When the fluid under pressure from the pump is open to the groove 33 it acts on the outer end of the valve 45 causing it to move inwards against the stop 51 in which position it uncovers the entry port 48 and thereby connects the space 20 to the pump 30. If the pressure is closed to the groove 33 the valve 45 takes up the position shown, whereby fluid in the space is exhausted through the port 49 and the drilling 50.

It will be observed that the valve 45 has to move an appreciable distance between the position in which it opens the exhaust 49 and the entry 48.

We claim:

1. In a device for supply and exhaust of liquid to and from a rotating hydraulic system having a rotating housing, and a movable means carried by said housing to form a space between the movable means and the housing into which space liquid is introduced, the provision of a valve chamber in said housing spaced at an appreciable distance radially from the axis of said housing, liquid inlet and exhaust ports in said chamber, said inlet port being adjacent the radially outer end of said chamber, at least one opening in said housing leading from said chamber to said space, valve means in said chamber for opening and closing communication between said inlet port and said opening for supplying liquid to said space and between said exhaust port and said opening for exhausting said space, said valve means comprising a piston pressed radially outwardly by a spring, said piston after moving radially inwards to close communication between said opening and said exhaust port having an appreciable movement before opening communication between said opening and said inlet port, said spring being light enough to permit a predetermined minimum pressure to move the piston to establish communication between said inlet port and said opening, valveless ducting in said housing leading from a liquid inlet opening in said housing to said inlet port and forming with said chamber and said first mentioned opening a channel for liquid to said space, said channel having at some radially outer part thereof a cross-sectional area considerably less than the cross-sectional area at the radially inner part of said channel in order to avoid cavitation in said channel, said valve means being of such weight that the centrifugal force thereof is equal to the centrifugal pressure developed by the liquid in said channel.

2. In a device for supply and exhaust of liquid to and from a rotating hydraulic system having a rotating housing and a movable means carried by said housing to form a space between the movable means and the housing into which space liquid is introduced, the provision of a valve chamber in said housing spaced at an appreciable distance radially from the axis of said housing, liquid inlet and exhaust ports in said chamber, said inlet port being adjacent the radially outer end of said chamber, at least one opening in said housing leading from said chamber to said space, valve means in said chamber for opening and closing communication between said inlet port and said opening for supplying liquid to said space and between said exhaust port and said opening for exhausting said space, said valve means comprising a piston pressed radially outwardly by a spring, said piston after moving radially inwards to close communication between said opening and said exhaust port having an appreciable movement before opening communication between said opening and said inlet port, said spring being light enough to permit a predetermined minimum pressure to move the piston to establish communication between said inlet port and said opening, valveless ducting in said housing leading from a liquid inlet opening in said housing to said inlet port and forming with said chamber and said first mentioned opening a channel for liquid to said space, said channel having at some radially outer part thereof a cross-sectional area considerably less than the cross-sectional area at the radially inner part of said channel in order to avoid cavitation in said channel, said valve means being of such weight that the centrifugal force thereof is equal to the centrifugal pressure developed by the liquid in said channel, the valve chamber and ducting being constructed to provide a volume of liquid displaced by the valve means equal to at least fifteen per cent of that contained within the said ducting.

HOWARD FREDERICK HOBBS.
JOSEPH ARTHUR THOMPSON.

References Cited in the file of this patent

UNITED STATES PATENTS

| Number | Name | Date |
|---|---|---|
| 2,143,321 | Kegresse | Jan. 10, 1939 |
| 2,163,203 | Kegresse | June 20, 1939 |
| 2,204,872 | Thompson | June 18, 1940 |
| 2,297,480 | Kratzmann | Sept. 29, 1942 |
| 2,328,092 | Nutt et al. | Aug. 31, 1943 |
| 2,386,217 | Kegresse | Oct. 9, 1945 |
| 2,440,589 | Kegresse | Apr. 27, 1948 |